US012561224B2

(12) United States Patent
Degani et al.

(10) Patent No.: US 12,561,224 B2
(45) Date of Patent: Feb. 24, 2026

(54) BEHAVIOR VERIFICATION FOR FINITE STATE MACHINE (FSM)-MODELLED SYSTEMS

(71) Applicant: GM GLOBAL TECHNOLOGY OPERATIONS LLC, Detroit, MI (US)

(72) Inventors: Asaf Degani, Tel Aviv (IL); Yael Shmueli Friedland, Tel Aviv (IL); Daniel Y. Rubin, Holon (IL); Shani Avnet, Tel Aviv (IL); Lisa M. Talarico, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 301 days.

(21) Appl. No.: 18/339,768

(22) Filed: Jun. 22, 2023

(65) Prior Publication Data

US 2024/0427689 A1 Dec. 26, 2024

(51) Int. Cl.
*G06F 11/3604* (2025.01)

(52) U.S. Cl.
CPC ................................. *G06F 11/3608* (2013.01)

(58) Field of Classification Search
None
See application file for complete search history.

(56) References Cited

U.S. PATENT DOCUMENTS 6,853,963 B1 2/2005 Apfelbaum et al.
9,292,419 B1 * 3/2016 Kintali ................ G06F 11/3676

2002/0035619 A1 * 3/2002 Dougherty ............ H04L 67/565
709/219
2003/0066050 A1 * 4/2003 Wang ................... G05B 19/045
717/105
2006/0085681 A1 * 4/2006 Feldstein ............ G06F 11/3692
714/25
2008/0250427 A1 * 10/2008 Shin .................... G06F 11/3608
719/318

(Continued)

OTHER PUBLICATIONS

David Harel; Statecharts: A Visual Formalism for Complex Systems; Science of Computer Programming 8 (1987) ; Department of Applied Mathematics, The Weizmann Institute of Science, Rehovot, Israel; pp. 231-274.

*Primary Examiner* — Qing Chen
(74) *Attorney, Agent, or Firm* — Quinn IP Law

(57) ABSTRACT

A method for verifying system behavior and correcting design flaws in a finite state machine (FSM)-modeled system or any other representational method that includes receiving from a user device via a model verification platform, data associated with the system design. The data describes states, state transitions, events, and outputs of the FSM-modeled system. The method includes searching the data for predetermined behavior of the FSM-modeled system, including predetermined state(s) and/or mode changes. The method includes flagging the predetermined behavior as a verified behavior and performing a control action in response to the verified behavior, including transmitting a notification to the user device that is indicative of the verified behavior, and a design recommendation where applicable. Instructions for the method may be recorded in a computer readable storage medium and executed by a processor to cause the model verification platform to perform the method.

20 Claims, 3 Drawing Sheets

(56) References Cited

U.S. PATENT DOCUMENTS

| 2009/0037884 A1* | 2/2009 | Benameur | G06F 11/3608 |
| | | | 717/126 |
| 2012/0101800 A1* | 4/2012 | Miao | G06F 11/3692 |
| | | | 703/22 |
| 2014/0258999 A1* | 9/2014 | Katihar | G06F 8/61 |
| | | | 717/168 |
| 2016/0026561 A1* | 1/2016 | Schur | G06F 11/3692 |
| | | | 714/38.1 |
| 2018/0239660 A1* | 8/2018 | Guha | G06F 11/0709 |

* cited by examiner

10

12

System Traits

15

21

$T_F$

16 User Inputs

13

14

110

MP

54

56

110

18

11

17

19S

20S $CC_{22}$

Model Verification Platform

25

22

Ext Device $T_i$

19

$T_P$

20

160

120

12A — 12B

12N

BEHAVIOR VERIFICATION FOR FINITE STATE MACHINE (FSM)-MODELLED SYSTEMS

INTRODUCTION

The present disclosure relates to a supportive software-based "toolbox" for aiding in the design and implementation of a finite state machine (FSM)-modeled systems having multiple states, state transitions/mode changes, and other potentially complex behavior. The present approach is intended to aid system designers, programmers, and other users during the system design process by identifying potential design flaws, and providing corrective recommendations as needed. In addition to behavioral aspects such as state or mode transition, other traits considered herein may include interface indication (icons, telltales, light bar, etc.), interaction schemes (push buttons, levelers, etc.), alerts and warnings, overall behaviors and conditions (response to traffic control devices or lack thereof), and escalation protocols for automated vehicle behavior (e.g., minimal risk maneuvers (MRM) while driving and minimal risk conditions (MRC) such as parking at a road's shoulder).

As appreciated in the art, finite state machines are mathematical abstractions frequently used to design and validate the behavior of a myriad of different software programs and physical systems. A finite state machine may be graphically represented as a stateflow diagram, state transition table, or a hierarchical state machine/diagram such as Statechart. FSM-modeled systems begin from an initial state. Based on the present state of the designed system and a given single event or combination of events ("super events"), a finite state machine is able to transition between various additional states in response to system inputs or triggering events. Although the above-noted well-used and appreciated in the art state transition tables or stateflow diagrams are instrumental to the overall system design process, a resulting system design could nevertheless exhibit suboptimal or incorrect design structure and behavior.

SUMMARY

Disclosed herein are automated systems and associated methods for aiding a user, e.g., a software programmer, designer, or system developer, in the verification of system behavior of a finite state machine (FSM)-modeled system. The automated methodology contemplated herein is particularly well suited for designing systems having relative complex and/or highly interactive behavioral traits, e.g., a wide range of possible states, state transitions, state or mode-triggering events, and outputs. For instance, motor vehicles having automation control capabilities have relatively complex operating modes and state transition rules. Some of these modes are executed automatically/autonomously or in response to driver inputs, while other modes may be based on timers, hidden logic, or other automatically occurring activation criteria. Other complex systems such as avionics, process control automation, medical devices, and associated control logic for a wide range of mobile or stationary systems are designed using finite state machine techniques, and would likewise benefit from the automated verification method as described in detail below.

According to an exemplary implementation, a method for verifying behavior of a finite state machine (FSM)-modeled system includes receiving, from a user device via a model verification platform, data associated with a design of the FSM-modeled system, wherein the data describes states, state transitions, events, and outputs of the FSM-modeled system. The method also includes searching the data via the model verification platform for predetermined behavioral properties of the FSM-modeled system, the predetermined behavior including one or more predetermined state and/or mode changes of the FSM-modeled system, as well as flagging the predetermined behavior in memory of the model verification platform as verified behavior. The method additionally includes performing a control action in response to the verified behavior, including transmitting a notification to the user device that is indicative of the verified behavior.

Receiving the data associated with the design of the FSM-modeled system may include receiving a state transition table or a stateflow diagram.

The verified behavior could include a problematic behavior, in which case the notification includes information associated with a location of the problematic behavior within the data. Performing the control action may include auto-generating one or more recommendations for correcting the problematic behavior.

The predetermined behavior according to one or more embodiments includes structural hierarchy properties. For instance, the structural hierarchy properties may include nesting, global events, and/or event consistency properties. The predetermined behavior could also include correctness properties, such as but not limited to system behavior properties, system control properties, and/or cognitive properties. The predetermined behavior of the FSM-modeled system in some implementations includes non-deterministic system behavior properties representing two or more different states having one behavioral manifestation.

A model verification platform is also disclosed herein. An embodiment of the model verification platform includes a system design module configured to receive, from a user device, data associated with a design of an FSM-modeled system, wherein the data describes states, state transitions, events, and outputs of the FSM-modeled system. A search module is configured to search the data for a predetermined behavior of the FSM-modeled system, with the predetermined behavior including one or more predetermined state and/or mode changes of the FSM-modeled system. An identification/flagging module is configured to flag the predetermined behavior in memory of the FSM-modeled system as a verified behavior. A design suggestion module in this embodiment is configured to perform a control action in response to the verified behavior, including transmitting a notification to the user device that is indicative of the verified behavior.

Also described herein is a non-transitory computer-readable storage medium on which is recorded computer-readable instructions that, when executed by one or more processors of a model verification platform, cause the one or more processors to implement the above-summarized method. For example, the processor(s) could receive, from a user device, data associated with a design of an FSM-modeled system, with the data describing states, state transitions, events, and outputs of the FSM-modeled system, and including a state transition table or a stateflow diagram. The processor(s) could be caused to search the data via the model verification platform for a predetermined behavior of the FSM-modeled system, the predetermined behavior including one or more predetermined state and/or mode changes of the FSM-modeled system, and to flag the predetermined behavior as a verified behavior. As part of this implementation, the processor(s) could be caused to perform a control action in response to the verified behavior, including transmitting a notification to the user device that is indicative of the verified behavior and includes recommendations for correcting at least some of the verified behavior.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure. The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

Figures 1, 1A:
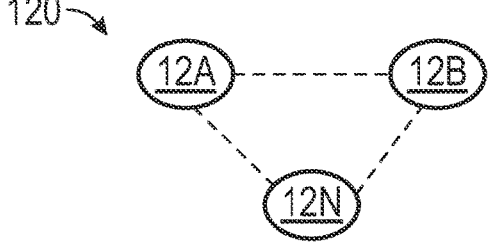
FIG. 1 illustrates an automated system for use in designing and implementing a system using finite state machine (FSM)-based design techniques, with the automated system being configured to verify and help correct behavior of the designed system in accordance with the disclosure.
FIG. 1A illustrates an exemplary embodiment of distributed processing nodes for use in implementing portions of the automated system shown in FIG. 1.

The present disclosure may be embodied in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

Referring to the drawings, wherein like reference numbers refer to like features throughout the several views, FIG. 1 depicts an automated system 10 configured to verify the behavior of a finite state machine (FSM)-modeled system. Due to the criticality of achieving as close to a perfect understanding and implementation of a designed system as is possible in the design process, and to develop systems that are free of incorrect structures that can lead to design errors and incorrect user interaction, it is useful to verify that the designed system and associated human-machine interfaces will behave in a logical manner and also that their behavior is such that is expected by a user 11, e.g., a designer or programmer, as opposed to a driver, pilot, or other end user of a physical embodiment of the modeled system.

To that end, the present solutions make it possible for the user 11 to employ a cataloged set of design structures that are known to be incorrect and thereafter search for such incorrect structure in a given design. Additionally, the present approach supports a structured hierarchical design of the modeled system as set forth herein. As described in detail below with reference to FIGS. 2 and 3, the automated system 10 as contemplated herein has two primary goals: (1) to initially identify, catalog, and search a design structure flowing from a given input data set, e.g., a state transition table, stateflow diagram, or hierarchical state machine, and (2) to support a more structured hierarchical design in tangible/physical embodiments of the FSM-modeled system.

The automated system 10 illustrated in FIG. 1 may include a user device 12, e.g., a laptop computer, tablet computer, desktop computer, mobile application ("app"), or another application-suitable host machine configured for assisting the user 11 in the design of potentially complex hardware and/or software-based system. Although the user device 12 is depicted in FIG. 1 as a single computer device for illustrative simplicity, those skilled in the art will appreciate that the user device 12 could be implemented as a distributed user device 120 having multiple processing nodes, e.g., 12A, 12B, . . . , 12N, as depicted schematically in FIG. 1A. Such processing nodes may be in communication with one another over suitable wired, wireless, and/or cloud-based networked connections. Underlying systems benefitting from the automated system 10 to design human-machine interfaces ("HMIs") or other devices aboard a motor vehicle or an aircraft, watercraft, rail vehicle, or another dynamic system, or to model performance of a medical device, powerplant, or another static system.

The automated system 10 illustrated in FIG. 1 may also include one or more peripheral devices 13, including a display screen 14 operable as an output device for the user device 12. The user 11 may interact with the user device 12 via one or more additional peripheral devices 13 (not shown), e.g., a mouse, keyboard, touch inputs to the display screen 14, etc., when developing or designing state transition tables for the FSM-modeled system, including functions of resident software and/or hardware thereof. The present solutions are intended to facilitate the downstream verification of system behavior subsequent to the proper and thorough design of an FSM and corresponding state transition table(s). Among the many possible attendant benefits of the present solutions, the user 11 is better able to identify, within the larger design, precisely where the design is not well structured and lacks adequate hierarchy.

As part of the present strategy, the user device 12 of FIG. 1 or its constituent processing nodes 12A, 12B, . . . , 12N of FIG. 1A may be equipped with non-transitory, tangible computer-readable storage medium or memory (M) 54, and one or more processors (P) 56, e.g., logic circuits, combinational logic circuit(s), Application Specific Integrated Circuit(s) (ASIC), electronic circuit(s), central processing unit(s), semiconductor IC devices, etc., as well as input/output (I/O) circuit(s), appropriate signal conditioning and buffer circuitry, and other components such as a high-speed clock to provide the described functionality. The associated memory 54 may include application-suitable amounts and types of non-transitory memory inclusive of read only, programmable read only, random access, a hard drive, etc., whether resident, remote or a combination of both.

Figure 3:
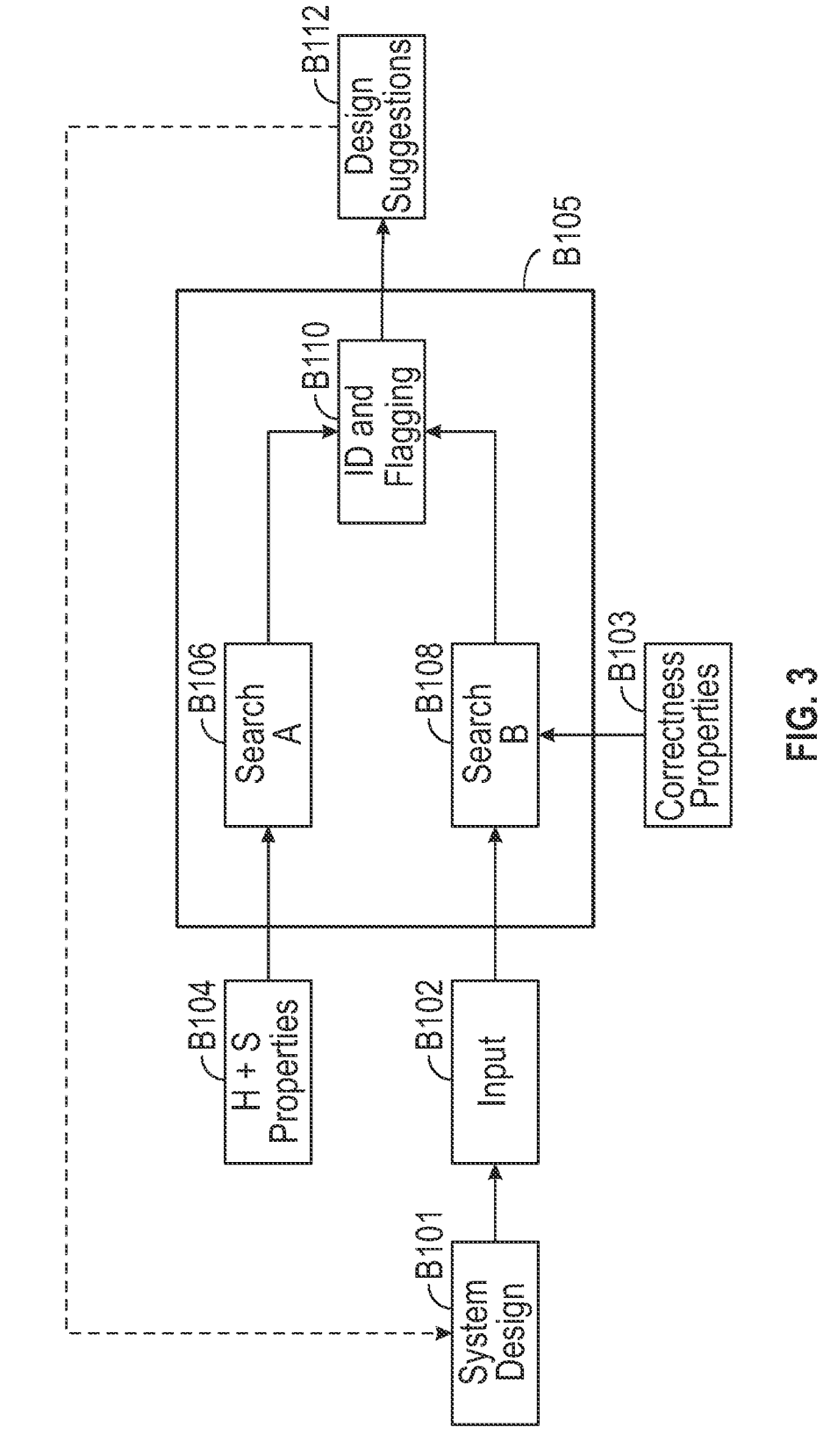
FIG. 3 is a flow diagram of a method for verifying system behavior in accordance with an embodiment of the disclosure.

Input Data: as a precursor to performing the method 100M of FIG. 3, the user device 12 illustrated in FIG. 1 receives system traits 15 and user inputs 16 from the user 11, with the user inputs 16 filling in the populated state transition table 20, thereby generating an updated version of the populated state transition table 20. That is, following the definitions of states and events and super events, the state transition table is populated automatically. The user 11 then inputs the destination states for each combination. This action could entail receiving various states, state transitions, and events of the modeled system, along with a possible "super-events" (event combinations), conditions (no response to traffic devices), hierarchy definitions, and other system traits 15.

In response to the received system traits 15, the user device 12 automatically generates and outputs a first data set 17 embodying a blank/unpopulated initial state transition table (Ti) 19. This initial state transition table 19 is indexed by as complete of a population of possible states and events of the modeled system as possible, and with the system traits 15 entered by the user 11. Additionally, the user device 12 in some embodiments automatically populates the initial state transition table 19 with a second data set 18 to generate a third data set 19S, with the third data set 19S including a populated state transition table ("Tp") 20.

That is, the user device 12 automatically generates ("auto-generates") the populated state transition table 20 in response to the system traits 15 and other user inputs 16. After performing one or more iterations, the user device 12 ultimately outputs a final state transition table (TF) 21. The final state transition table 21 may serve as data 110 associated with the design of the FSM-modeled system, with the data 110 used by a model verification platform 25 in accordance with the disclosure. The data 110 thus is a starting point for further investigation by the user 11 when performing the method 100M of FIG. 3, when verifying that the FSM-modeled system does not exhibits incorrect system behaviors, or exhibits or lacks other predetermined behavior as intended.

Figure 2:
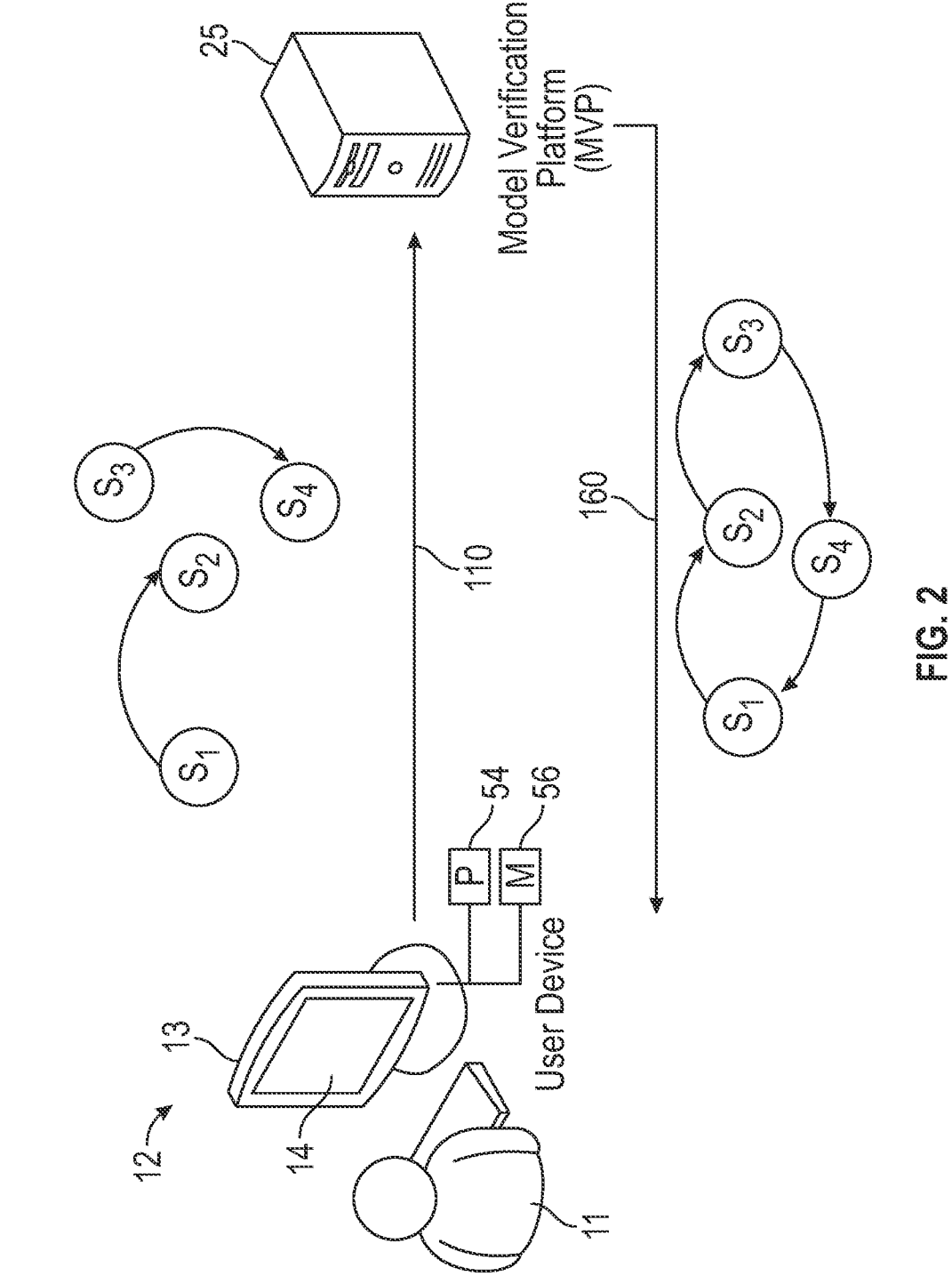
FIG. 2 illustrates a behavioral verification method in accordance with the disclosure.

Referring briefly to FIG. 2, the automated system 10 of FIG. 1 may involve interaction of the user device 12 and the model verification platform 25. In general, the present approach involves receiving the data 110 associated with a system design, including the various states, state transitions, events, and outputs as noted above. The final state table 21 of FIG. 1 may be included with or fully embody the data 110. As contemplated herein, the model verification platform 25 could process and search/analyze the data 110, e.g., via a suitable search algorithm, for the existence of predetermined behavior and/or other desired properties.

The model verification platform 25 would thereafter demarcate, identify, or otherwise "flag" the predetermined behavior as "verified behavior", with "verified" referring to a post-search state of the flagged behavior. A control action may then be performed in response to the verified behavior as set forth below. For instance, nominal states S1, S2, S3, and S4 may be specified in the data 110, potentially with problematic behavior or other properties such as undefined or poorly defined states or mode transitions as shown. As part of the present method 100M of FIG. 3, the model verification platform 25 could thereafter perform one or more control actions associated with the flagging the behavior, for instance by outputting a notification 160 to the user device 12 and/or an external device 22 as part of this action.

As noted below, the model verification platform 25 of FIGS. 1 and 2 may transmit one or more notifications 160 as specific recommendations for correcting problematic behavior in the system design. For example, recommendations for correcting or better defining transitions between the nominal states S1, S2, S3, and S4 could be part of the notifications 160. The user device 12 as part of such an exchange could receive the notification 160 and possibly provide recommendations to the user 11 in response to the notification 160.

In some implementations, the model verification platform 25 may transmit information associated with the identification and location of a problematic behavior or other property that does not include recommendations for correction. In this way, the model verification platform 25 could be used to identify potential design flaws and provide recommendations/suggestions for correcting state tables or stateflow diagrams, and possibly conserve computing resources (e.g., processors, memory, and/or the like) that might otherwise be wasted. Thus, use of the model verification platform 25 facilitates design of an FSM-modeled system, with improved speed and efficiency of the design process and quality of designs being just some of the attendant benefits.

Referring now to FIG. 3, a logic flow diagram is shown that illustrates an embodiment of the present method 100M. The logic flow diagram is constructed from constituent logic segments or blocks, with each block implemented manually and/or automatically as needed, e.g., as one or more algorithms or code segments. Those skilled in the art will appreciate that the flow diagram of FIG. 3 also lends itself to the implementation of constituent hardware/software modules each configured to perform the associated tasks. Thus, the terms "block" and "module" are used hereinbelow synonymously.

Blocks B101 (System Design Module) and B102 (Input Module) feed into method 100M and together enable the user device 12 of FIG. 1 to receive data associated with the design of the FSM-modeled system ("system design"). As contemplated herein, the system design module/Block B101 provides as complete a record as possible of the states, state transitions, events, and user-facing indications ("outputs") of the FSM-modeled system. Block B101 is configured for constructing a viable system design for the FSM-modeled system. As appreciated in the art, this effort in turn involves the generation and error-checking of one or more state transition tables and/or transition diagrams, e.g., using the automated approach described in U.S. patent application Ser. No. 18/318,006, filed on May 16, 2023, which is hereby incorporated by reference in its entirety, or using another sufficiently developed state transition table, e.g., the final state transition table 21 of FIG. 1. Such data is received at block B102 as inputs to the method 100M.

Block B103 (Correctness Property Module), which may be performed by or made part of the model verification platform 25 of FIG. 1, is configured for generating or constructing a list of generic system behavior, possibly in the form of subjective or objective "correctness" properties. As contemplated herein, such a list of behavior could include desired system behavior, control inputs/outputs, cognitive actions of potential users of the FSM-modeled system, and/or hierarchical structure of the various states, state transitions, events, and other data associated with the current system design. The list of correctness properties or other behavior is then fed into a processing block B105 and its resident blocks B108, B110, and B112.

Block B104 (Hierarchy and Simplification Module) of FIG. 3 provides additional inputs to the processing block B105. For instance, block B104 could output a list of hierarchy and simplification ("H+S") properties for the FSM-modeled system in question. While such properties may vary with the intended application, relevant properties may include, e.g., nesting properties defining grouped or related aspects of the defined properties, global events (as opposed to local or private events), consistency features such as common definitions, etc.

Block B105 for its part includes constituent blocks B106, B108, and B110. At block B106 (Search Module A), the above-noted data is analyzed, e.g., the block B106 is configured to search the list of hierarchy and simplification properties from block B104 for a lack of sufficient structural hierarchy, e.g., using a suitable search engine or algorithm as appreciated in the art. The hierarchy and simplification properties are made available as state flow diagrams and/or transition tables, with this block ultimately analyzing the data for a lack of sufficient structural hierarchy. Similarly, block B108 (Search Module B) could use the same or another search algorithm to search the list of correctness properties (or other desired properties) from block B103 for incorrect or otherwise problematic behavior within the scope of the disclosure. Blocks B106 and B108 could then output their respective results to block B110 (ID and Flagging Module), with block B110 thereafter identifying problematic behavior from the generated results.

Problematic Behavior Properties: objectively or subjectively "problematic" or undesirable behavioral properties are then output to block B112 for further action in accordance with a non-limiting embodiment. This action may include flagging each problematic behavior and thereafter performing one or more actions associated therewith. As an example, this action could include transmitting the notification 160 of FIGS. 1 and 2 to the user device 12, with the notification 160 possibly including information associated with the identification and location of the problematic behavior or other property.

Block B112 (Design Suggestion Module) of FIG. 3 could also include generating one or more recommendations for correcting the problematic behavior in this embodiment. Problematic behavior as contemplated herein could include verification properties, structural hierarchy properties, and/ or correctness properties. Verification properties within the scope of the method 100M may include a set of predefined properties, wherein the user 11 of FIG. 1 may define the set of predefined properties. The set of predefined properties could be used to verify whether the predefined properties exist in the data 110 of FIGS. 1 and 2.

The presence or absence of one or more predefined properties in the set of predefined properties could represent a particular quality of the system design that is associated with the data. Examples of verification properties that subjectively "should" exist, e.g., in the discretion of the user 11, may include clear hierarchical structures, the use of global events to reduce complexity, and the reduction in the number of events (i.e., private events). In a similar vein, examples of verification properties that "should not" exist may include design structures of the FSM-modeled system. The actual system could become unpredictable due to poor indications and perhaps overly complex behavior that the system designers may not have anticipated. Structural hierarchy properties for their part could include nesting, global events, and event consistency as well as inheritance of attributes (from parent to child).

Correctness Properties: within the scope of the method 100M of FIG. 3, correctness properties may include desired system behavior properties, system control properties, and cognitive properties, among other possible properties. System behavior properties are associated with the behavior of a system, and may include, e.g., properties related to (1) non-determinism, (2) error state. (3) augmenting state, (4) restricting state, (5) augmenting actions, (6) delayed actions, and/or (7) intermittent event blocking.

Non-determinism: the non-deterministic nature of this property represents two or more different states having one behavioral manifestation. For example, cases where different states—each representing a different automation behavioral attribute (e.g., driving on the highway vs driving on a traffic light laden route), automation behavior (e.g., escalation protocol), and automation/user control (e.g., lateral/longitudinal)—could have similar behavior manifestation. Another example is that of a car door opening mechanism. Some vehicles have push buttons on the outside door handle that become enabled when key fob proximity is detected. When enabled, a push of this button unlocks the vehicle. However, the driver entering the vehicle does not know when the button is enabled or not (no light is provided). Because the detection mechanism is not 100% reliable, sometimes pushing the button unlocks the doors and sometimes it does not. In other words, the event automatic enablement does not get initiated. Drivers cannot see all of these internal (enable, disable) state changes, and thus from their perspective the system is non-deterministic.

Error state: this next property represents a contradiction between the underlying behavioral model and the representation model which is communicated to the end user. That is, the actual behavioral (implementation) model is in one state, while the representation model is in another state. For example, the implementation model automatically transitions to a state that is not part of the representation model, and not alluded to there.

Augmenting state: continuing with the exemplary properties noted above, this additional property represents a situation in which the requirements demand that a certain state change is possible, but the behavioral (implementation) model does not have such state.

Restricting state: as used herein, the "restricting state" property represents a situation in which the representation model is oblivious to event(s) that can in fact trigger state changes in the finite state machine. When the event takes place, the configuration of the system changes with no accounting for such a change.

Augmenting actions: within the scope of the method 100M of FIG. 3, this property represents situations where the inputs from the user of the FSM-modeled system conflict with automatic inputs. Conflicting actions may be categorized as assisting actions and opposing actions. An assisting action may occur when the automatic inputs reduce the user inputs; thereby, conflicting with the amount of user inputs required. For example, a driver might turn the steering wheel of a vehicle in a specific direction. The automatic input also turns the steering wheel in the same direction as the driver, thereby reducing the amount of torque required by the driver to turn the steering wheel in the specific direction. This can be a problem when the automation ceases its action but the driver is places the same torque inputs as before.

An opposing action may occur in this example scenario when the automatic inputs oppose the user inputs. For example, a driver turns the steering wheel of a vehicle in a specific direction. The automatic input turns the steering wheel in the opposite direction of the driver; thereby, increasing the amount of torque required by the driver to turn the steering wheel in the specific direction. System control properties for their part are associated with system controls affecting the user inputs into the system, e.g., opposing control. Opposing control as contemplated herein represents a situation where the user inputs (e.g., steering wheel rotation) are being opposed by automatic inputs (e.g., Lane-Keeping Assist). Cognitive properties considered in the course of performing the method 100M of FIG. 3 are associated with logic of the FSM-modeled system.

Cognitive properties may include, but are not limited to, e.g., (i) multiple states which share similar set of indications such as illuminated icons, LEDs, etc., but have non-similar behavior (output). This could confuse a user of the physical system as the indications are not consistent with the system behavior, (ii) multiple similar indications with a resulting affordance for a certain behavior, which corresponds to only one of them (or not all of them), (iii) a single state (or a set of states) with corresponding integrated indication. The integrated indication is made up of two or more values, each expressing different characteristic of the system. A user of a certain population segment in which the indication is not readily distinguishable by a certain population segment, e.g., color blind users, may be insensitive to their format and will fail to distinguish between them, (iv) one state with two indications (cases where the same state, and corresponding behavior, is labeled by two different indications), and (v) two internal states with one visible indication, transitioning on the same event into two different control behaviors (e.g., opposing control event in a Lane-Keeping Assist System).

Continuing with this discussion, additional cognitive properties could include (vi) two initial and/or intermediate states with one visible indication, transitioning on the same event, into two end states with separate indications and different control behaviors (vii) two initial states with one visible indication, transitioning on a first, identical, event into two intermediate states with one visible indication. The activation of a second, identical, event transitions the intermediate states into two end states with separate indications and different control behaviors (non-determinism with potential delay), (viii) two initial states with separate indications transitioning on the same event, into two end states with separate indications. This refers to cases where the same event (e.g., a similar button push) is used by many states of the system and yields different results depending on the original states. A list of cognitive properties (above) and a corresponding set of ways to deal with them follows.

The model verification platform 220 may generate one or more recommendations/suggestions for correcting one or more flagged problematic properties in a correction algorithm. The correction algorithm may generate one or more recommendations/suggestions based on the flagged problematic properties. The correction algorithm may provide the recommendations/suggestions based on the following non-limiting conditions: (i) two similar indications with corresponding non-similar meaning, e.g., a suggestion to change to a one state indication may be provided to the user 11, (ii) multiple similar indications with a resulting affordance for a certain behavior, which corresponds to only one of them (or not all of them) e.g., a suggestion to change a manifestation in the state that does not require this behavior, such that the affordance is canceled out may be provided to the user 11, (iii) a single state (or a set of states) with corresponding integrated indication. The integrated indication is made up of two or more values, each expressing different characteristic of the system. An end user of a certain population segment (e.g., color blind drivers of a vehicle) may be insensitive to their format and hence fail to distinguish between them. The user 11 could be provided a suggestion or recommendation to add an additional indication property to make the separation distinguishable to eventual end users with perceptual impairments, and (iv) one state with two indications (cases where the same state, and corresponding behavior, is labeled by two different indications), which could result in the notification 160 including a recommendation to change an indication property, or split the initial state into two meaningful states.

Still other examples of cognitive properties in this vein include (v) two internal states with one visible indication, transitioning on the same event into two different control behaviors (e.g., opposing control event in a Lane-Keeping Assist System). This could result in providing the user 11 with a recommendation to change one state indication, (vi) two initial and/or intermediate states with one visible indication, transitioning on the same event into two end states with separate indications and different control behaviors, for abstraction reasons. A notification could be provided before a rare or unexpected state transition with an explanation for the reason for the unexpected transition, (vii) two initial states with one visible indication, transitioning on a first, identical, event into two intermediate states with one visible indication. The activation of a second, identical, event transitions the intermediate states into two end states with separate indications and different control behaviors (non-determinism with potential delay).

In response, the notification 160 could be that a delayed state transition is about to take place once the system can predict this, or (xiii) two initial states with separate indications transitioning on the same event, into two end states with separate indications. Using local rules imposes high memory load on the end-user, in which case the model verification platform 25 could provide the notification 160 presenting subtle cues to the end-user with the transition. This latter action could also entail supporting the memory load of the user device 12 of FIGS. 1 and 2 with subtle cues along simple notifications regarding the expected transition. If the event is a user-initiated event, the model verification platform 25 could help the user 11 determine when this behavior is not warranted.

The solutions of the present disclosure therefore provide the user 11 of FIGS. 1 and 2 with an improved data verification method that aids in the design and implementation of complex systems. Using the user device 12 and its programmed functionality as set forth above, the user 11 is intuitively guided through verification of system behavior and other predetermined properties. Such behavior could be problematic from the perspective of the user 11 as noted above. Using this methodology, one could describe a system and thereafter verify its design correctness. Since the models are mathematical in nature, it is possible to use computing power to verify them. Verification is done be defining a set of structures, or formal properties (both logical and cognitive as discussed above), that the user 11 wishes to ensure exists, e.g., clear hierarchical structures and the user of global events to reduce complexity, or not exist, e.g., where the system becomes unpredictable to the user 11 due to poor indications, and perhaps due to overly complex behavior. These and other attendant benefits will be appreciated by those skilled in the art in view of the disclosure.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for aiding system designers, programmers, and other users in designing, implementing, and verifying behaviors of a finite state machine (FSM)-modeled system, comprising:

receiving, from a user device, via a model verification platform, data associated with a design of an FSM-modeled system, wherein the data describes states, state transitions, events, and outputs of the FSM-modeled system;

searching, via the model verification platform, the data for one or more predetermined behavior properties of the FSM-modeled system, wherein the one or more predetermined behavior properties of the FSM-modeled system include one or more predetermined states and/or mode changes of the FSM-modeled system;

flagging, via the model verification platform, the one or more predetermined behavior properties of the FSM-modeled system, in a memory of the model verification platform, as one or more verified behavior properties of the FSM-modeled system; and performing, via the model verification platform, a control action to correct the one or more verified behavior properties of the FSM-modeled system in response to the one or more verified behavior properties of the FSM-modeled system, including transmitting a notification to the user device that is indicative of the one or more verified behavior properties of the FSM-modeled system;

wherein the one or more predetermined behavior properties of the FSM-modeled system include cognitive properties associated with logic of the FSM-modeled system;

wherein the cognitive properties include multiple states which share a set of indications, but have different behavior;

wherein the cognitive properties include two initial and/or intermediate states with one visible indication, transitioning on a same event, into two end states with separate indications and different control behaviors;

wherein the cognitive properties include two initial states with one visible indication, transitioning on a first identical event into two intermediate states with one visible indication;

wherein the cognitive properties include two internal states with one visible indication, transitioning on a same event into two different control behaviors; and wherein activation of a second identical event transitions one or more intermediate states into two end states with separate indications and different control behaviors.

2. The method of claim 1, wherein receiving the data associated with the design of the FSM-modeled system includes receiving the data as a state transition table.

3. The method of claim 1, wherein receiving the data associated with the design of the FSM-modeled system includes receiving the data as a stateflow diagram.

4. The method of claim 1, wherein the one or more verified behavior properties of the FSM-modeled system include a problematic behavior, and wherein the notification includes information associated with a location of the problematic behavior within the data.

5. The method of claim 4, wherein performing the control action includes auto-generating one or more recommendations to correct the problematic behavior, and wherein the notification includes the one or more recommendations to correct the problematic behavior.

6. The method of claim 1, wherein the one or more predetermined behavior properties of the FSM-modeled system include structural hierarchy properties.

7. The method of claim 6, wherein the structural hierarchy properties include nesting, global events, and/or event consistency properties.

8. The method of claim 1, wherein the one or more predetermined behavior properties of the FSM-modeled system include correctness properties.

9. The method of claim 8, wherein the correctness properties include system behavior properties and/or system control properties.

10. The method of claim 1, wherein the one or more predetermined behavior properties of the FSM-modeled system include non-deterministic system behavior properties representing two or more different states having one behavioral manifestation.

11. A model verification platform, comprising:

a system design module configured to receive, from a user device, data associated with a design of a finite state machine (FSM)-modeled system, wherein the data describes states, state transitions, events, and outputs of the FSM-modeled system;

a search module configured to search the data for one or more predetermined behavior properties of the FSM-modeled system, wherein the one or more predetermined behavior properties of the FSM-modeled system include one or more predetermined states and/or mode changes of the FSM-modeled system;

an identification/flagging module configured to flag the one or more predetermined behavior properties of the FSM-modeled system, in a memory of the model verification platform, as one or more verified behavior properties of the FSM-modeled system; and a design suggestion module configured to perform a control action to correct the one or more verified behavior properties of the FSM-modeled system in response to the one or more verified behavior properties of the FSM-modeled system, including transmitting a notification to the user device that is indicative of the one or more verified behavior properties of the FSM-modeled system;

wherein the one or more predetermined behavior properties of the FSM-modeled system include cognitive properties associated with logic of the FSM-modeled system;

wherein the cognitive properties include multiple states which share a set of indications, but have different behavior;

wherein the cognitive properties include two initial and/or intermediate states with one visible indication, transitioning on a same event, into two end states with separate indications and different control behaviors;

wherein the cognitive properties include two initial states with one visible indication, transitioning on a first identical event into two intermediate states with one visible indication;

wherein the cognitive properties include two internal states with one visible indication, transitioning on a same event into two different control behaviors; and wherein activation of a second identical event transitions one or more intermediate states into two end states with separate indications and different control behaviors.

12. The model verification platform of claim 11, wherein the system design module is further configured to receive the data as a state transition table.

13. The model verification platform of claim 11, wherein the system design module is further configured to receive the data as a stateflow diagram.

14. The model verification platform of claim 11, wherein the one or more verified behavior properties of the FSM-modeled system include a problematic behavior, and wherein the notification includes information associated with a location of the problematic behavior within the data.

15. The model verification platform of claim 14, wherein the design suggestion module is further configured to auto-generate one or more recommendations to correct the problematic behavior, and wherein the notification includes the one or more recommendations to correct the problematic behavior.

16. The model verification platform of claim 11, wherein the one or more predetermined behavior properties of the FSM-modeled system include structural hierarchy properties.

17. The model verification platform of claim 16, wherein the structural hierarchy properties include nesting, global events, and/or event consistency properties.

18. The model verification platform of claim 11, wherein the one or more predetermined behavior properties of the FSM-modeled system include correctness properties, and wherein the correctness properties include system behavior properties and/or system control properties.

19. The model verification platform of claim 11, wherein the one or more predetermined behavior properties of the FSM-modeled system include non-deterministic system behavior properties representing two or more different states having one behavioral manifestation.

20. A non-transitory computer-readable storage medium on which is recorded computer-readable instructions that, when executed by one or more processors of a model verification platform, cause the one or more processors to:

receive, from a user device, via the model verification platform, data associated with a design of a finite state machine (FSM)-modeled system, wherein the data describes states, state transitions, events, and outputs of the FSM-modeled system, wherein the data includes a state transition table or a stateflow diagram;

search, via the model verification platform, the data for one or more predetermined behavior properties of the FSM-modeled system, wherein the one or more predetermined behavior properties of the FSM-modeled system include one or more predetermined states and/or mode changes of the FSM-modeled system;

flag, via the model verification platform, the one or more predetermined behavior properties of the FSM-modeled system, in a memory of the model verification platform, as one or more verified behavior properties of the FSM-modeled system; and perform, via the model verification platform, a control action to correct the one or more verified behavior properties of the FSM-modeled system in response to the one or more verified behavior properties of the FSM-modeled system, including transmitting a notification to the user device that is indicative of the one or more verified behavior properties of the FSM-modeled system and includes one or more recommendations to correct the one or more verified behavior properties of the FSM-modeled system;

wherein the one or more predetermined behavior properties of the FSM-modeled system include cognitive properties associated with logic of the FSM-modeled system;

wherein the cognitive properties include multiple states which share a set of indications, but have different behavior;

wherein the cognitive properties include two initial and/or intermediate states with one visible indication, transitioning on a same event, into two end states with separate indications and different control behaviors;

wherein the cognitive properties include two initial states with one visible indication, transitioning on a first identical event into two intermediate states with one visible indication;

wherein the cognitive properties include two internal states with one visible indication, transitioning on a same event into two different control behaviors; and wherein activation of a second identical event transitions one or more intermediate states into two end states with separate indications and different control behaviors.

* * * * *